(12) United States Patent
Chen et al.

(10) Patent No.: US 7,190,442 B1
(45) Date of Patent: Mar. 13, 2007

(54) METHOD OF EVALUATING FIBER PMD USING POTDR TRACE

(75) Inventors: Xin Chen, Corning, NY (US); Nicol Alexander Heron, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/218,068

(22) Filed: Aug. 31, 2005

(51) Int. Cl.
*G01N 21/00* (2006.01)

(52) U.S. Cl. .................................... 356/73.1
(58) Field of Classification Search ................ None
See application file for complete search history.

(56) References Cited

U.S. PATENT DOCUMENTS

| | | | |
|---|---|---|---|
| 5,384,635 A | 1/1995 | Cohen et al. | 356/73.1 |
| 5,432,637 A | 7/1995 | Hakimi | 359/497 |
| 5,621,518 A | 4/1997 | Beller | 356/73.1 |
| 5,652,715 A | 7/1997 | Hanson | 364/574 |
| 5,966,207 A | 10/1999 | Haskins et al. | 356/73.1 |
| 6,204,924 B1 | 3/2001 | Cyr | 356/453 |
| 6,211,950 B1 | 4/2001 | Walter | 356/73.1 |
| 6,229,599 B1 | 5/2001 | Galtarossa | 356/73.1 |
| 6,462,863 B1 * | 10/2002 | Atieh et al. | 359/337.5 |
| 6,504,604 B1 * | 1/2003 | Holland | 356/73.1 |
| 6,630,992 B1 | 10/2003 | Vobian et al. | 356/73.1 |
| 6,724,469 B2 * | 4/2004 | Leblanc | 356/73.1 |
| 6,822,793 B2 | 11/2004 | Xie et al. | 359/497 |
| 2004/0046995 A1 | 3/2004 | Silverbrook et al. | 358/1.15 |
| 2004/0084611 A1 | 5/2004 | Chen et al. | 250/225 |
| 2004/0136636 A1 | 7/2004 | Rogers | 385/11 |
| 2004/0175171 A1 | 9/2004 | Kokkinos | 398/14 |
| 2005/0002017 A1 | 1/2005 | Haran | 356/73.1 |
| 2005/0018174 A1 | 1/2005 | Yano et al. | 356/73.1 |

FOREIGN PATENT DOCUMENTS

| | | |
|---|---|---|
| WO | 1998/36256 | 8/1998 |
| WO | 2002/095349 | 11/2002 |
| WO | 2004/010098 | 7/2003 |
| WO | 2005/060130 | 6/2005 |

OTHER PUBLICATIONS

Galtarossa et al., "*Measurements of beat length and perturbation length in long single-mode fibers*", Optics Letters, vol. 25, No. 6, Mar. 15, 2000, pp. 384-386.

(Continued)

*Primary Examiner*—Tu T. Nguyen
(74) *Attorney, Agent, or Firm*—Joseph M. Homa (57) ABSTRACT

A method for screening fiber polarization mode dispersion using a polarization optical time domain reflectometer is disclosed. A pulse radiation is emitted into an end of the fiber under test, and the backscattered radiation is measured by the POTDR and used to obtain an OTDR trace. A pulse radiation is emitted into an opposite end of the fiber under test, and the backscattered radiation is measured by the POTDR and used to obtain another OTDR trace. Either one or both traces are analyzed to compare the variation of intensity of signals along the length of the fiber, the variation in signals relating to the PMD along the length of the fiber.

12 Claims, 4 Drawing Sheets

OTHER PUBLICATIONS

Ellison et al., "*A Fully Polarimetric Optical Time-Domain Reflectometer*", Photonics Technology Letters, vol. 10, No. 2, Feb. 1998, pp. 246-248.

Ross, "*Birefringence measurement in optical fibers by polarization-optical time-domain reflectometry*", Applied Optics, vol. 21, No. 19, Oct. 1, 1982, pp. 3489-3495.

Ozeki et al., "*Birefringence distribution along fiber length*", OFC '96 Technical Digest, pp. 295-297.

Schuh et al., "*Theoretical analysis and measurement of the effect of fiber twist on the polarization OTDR of optical fibers*", OFC '96 Technical Digest, pp. 297-298.

Galtarossa et al., "*Spatially Resolved PMD Measurements*", Journal of Lightwave Technology, vol. 22, No. 4, Apr. 2004, pp. 1103-1115.

Rogers, "*Polarization-optical time domain reflectometry: a technique for the measurement of field distributions*", Applied Optics, vol. 20, No. 6, Mar. 15, 1981, pp. 1060-1074.

Chen et al., "*Properties of polarization evolution in spun fibers*", Optics Letters, vol. 28, No. 21, Nov. 1, 2003, pp. 2028-2030.

Huttner et al., "*Distributed PMD Measurement with a Polarization-OTDR in Optical Fibers*", Journal of Lightwave Technology, vol. 17, No. 10, Oct. 1999, pp. 1843-1848.

Ozeki et al., "*Polarization-mode dispersion measurement by an optical time-domain reflectometer with polarimetry assuming backscattering by randomly oriented nonspherical particles*", Optics Letters, vol. 28, No. 15, Aug. 1, 2003, pp. 1293-1295.

Rogers, "*Distributed Fibre Measurement using Backscatter Polarimetry*", Optical Fiber Sensors Conference Technical Digest, 2002, vol. 1, pp. 367-370.

Conibear et al., "*Locating High PMD Sections of an Overhead Cable using Polarization-OTDR*", Symposium on Optical Fiber Measurements, 2004, Technical Digest pp. 103-108.

Kim et al., "*Use of Polarization-Optical Time Domain Reflectometry for Observation of the Faraday Effect in Single-Mode Fibers*" Journal of Quantum Electronics, vol. QE-18, No. 4, Apr. 1982, pp. 455-456.

A. Fougères, "*Polarization OTDR: Locating High-PMD Fibers*", Application Note 087, www.exfo.com, ANOTE87.lan, © 2002 Exfo Electro-Optical Engineering Inc.

Vengsarkar et al., "*Polarisation Optical time Domain Reflectometry For Statistical Evaluation Of Polarisation Mode Dispersion*", Electronics Letters, vol. 29, No. 10, 13th May 1993, pp. 848-850.

Nakazawa, "*Theory of Backward Rayleigh Scattering in Polarization-Maintaining Single-Mode Fibers and Its Application to Polarization Optical Time Domain Reflectometry*", Journal of Quantum Electronics, vol. QE-19, No. 5, May 1983, pp. 854-861.

Wegmuller et al., "*Distributed Beatlength Measurement in Single-Mode Fibers With Optical Frequency-Domain Reflectometry*", Journal of Lightwave Technology, vol. 20, No. 5, May 2002, pp. 828-835.

Sunnerud et al., "*Measurement of Polarization Mode Dispersion Accumulation Along Installed Optical Fibers*", Photonics Technology Letters, vol. 11, No. 7, pp. 860-862, 1999.

Huttner et al., "*Local Birefringence Measurements in Single-Mode Fibers with Coherent Optical Frequency-Domain Reflectometry*", Photonics Technology Letters, vol. 10, No. 10, Oct. 1998, pp. 1458-1460.

Gisin et al., "*Polarization Mode Dispersion of Short and Long Single-Mode Fibers*", Journal of Lightwave Technology, vol. 9, No. 7, Jul. 1991, pp. 821-827.

Chen et al., "*Scaling properties of polarization mode dispersion of spun fibers in the presence of random mode coupling*", Optics Letters, vol. 27, No. 18, pp. 1595-1597, 2002.

Wuilpart et al., "*Polarization Mode Dispersion Mapping in Optical Fibers With a Polarization-OTDR*", Photonics Technology Letters, vol. 14, No. 12, Dec. 2002, pp. 1716-1718.

Tardy et al., "*Fiber PMD analysis for optical-fiber cable using polarization OTDR*", OFC '95 Optical Fiber Communication, Summaries of Papers Presented at the Conference on Optical Fiber Communication, vol. 8, Technical Digest Series, Postconference Edition, 1995, pp. 236-139.

Fougères et al., "*Detection of high PMD sections along installed fibers by means of a polarization-OTDR*", Proceedins of SPIE vol. 4906, 2002, pp. 319-327.

Wegmuller et al., "*Investigation of Spun Fibers using High Resolution Reflectometry*", Presented at OFC/NFOEC Conference on Mar. 8, 2005, 3 pages, available on CD-ROM from Optical Society of America, Washington, DC.

\* cited by examiner

METHOD OF EVALUATING FIBER PMD USING POTDR TRACE

BACKGROUND OF THE INVENTION

1. Field of the Invention

The present invention relates generally to optical fibers, and particularly to a method for identifying optical fibers which exhibit elevated polarization mode dispersion (PMD).

2. Technical Background

PMD is an important factor in the design of state-of-art fiber optic transmission systems. The effect of PMD in fiber systems is evident when, after propagating a sufficient distance in the network, one digital pulse may spread in the time domain and become indistinguishable from a nearby pulse. The pulse spreading from PMD can introduce errors into the data transmission, effectively limiting the transmission rate of the pulses or the maximum distance of the concatenated fiber medium. Polarization mode dispersion (PMD) can be a major limitation for high data rate optical communications systems and is thus an important fiber attribute that fiber manufacturers monitor closely. One notorious aspect of fiber PMD is that the fiber having the highest PMD value (sometimes referred to as the fiber PMD "outlier") dictates the performance of the overall system. Although fiber outliers usually represent a very small percentage of the whole population of newly made fibers, the effect of such fibers can be very detrimental. A single fiber with significantly elevated PMD increases the PMDq specification, a parameter that is very sensitive to the highest PMD in a population of fibers. Fiber PMD failure identified at a cable plant can also incur significant financial loss to the fiber makers.

Recent progress has been made in detecting fibers with elevated PMD using polarization optical time domain reflectometry (POTDR). See: B. Huttner, B. Gisin, and N. Gisin, "Distributed PMD measurement with a polarization-OTDR in Optical fibers", J. Lightwave Technology, 17, 1843 (1999); X. Chen et al. "Method of evaluating fiber PMD using polarization optical time domain reflectometry", US2004/0084611; P. Fayolle et al., "Polarized Lightwave reflectometry method (POTDR)", US2004/0046995; and S. Tanigawa et al., "Optical fiber polarization-mode dispersion measurement method and measurement device", PCT/JP2003/009175. Fibers with elevated PMD can be identified and removed so that the PMD uniformity of the fibers and the compliance with the specification can be ensured. However, a common feature of the above known methods is that they are effective only when the fiber has elevated PMD over a sufficiently long length to permit detection by those schemes. But, at the very local level the metric that is used to judge the fiber PMD often fluctuates significantly. It is desirable for a measurement scheme that is capable of detecting major PMD failure at (or within a) very local regime, even down to a matter of a few meters, because major failure of fiber PMD can occur within a very short fiber length. In some instances, PMD failures have been detected and linked to gas bubbles or air lines, sometimes called seeds, in the fiber perform, between the interfaces of different preform manufacturing steps, which can occur more often in the manufacture of fibers with complex refractive index profiles made with multiple steps, although similar conditions can occur in the manufacture of relatively simple step index fibers. The extent of the elevated PMD due to such seeds can range from a meter and more along the length of the fiber.

SUMMARY OF THE INVENTION

The present invention relates to a method for measuring polarization mode dispersion (PMD) in an optical fiber. The optical fiber can be screened for elevated PMD that may occur along the length of the fiber. Radiation is sent or launched into a length of optical fiber along its longitudinal axis. The radiation is preferably a pulsed radiation, such as pulsed radiation emitted from a laser source.

Radiation which is backscattered or reflected back through the fiber from the launched radiation is then measured and analyzed to obtain information about the variation in intensity of the backscattered radiation along the length of the fiber. The variation in intensity can then be related to the polarization mode dispersion in the optical fiber to identify one or more regions in the length of the fiber which exhibit disparate and/or unacceptable PMD indicative of PMD defects. Such measurements can be employed to non-destructively determine whether the PMD of the fiber is above a predetermined threshold at some point along the length of the fiber without having to destroy the fiber. We have found that we can identify relatively short sections of optical fiber having elevated PMD due to one or more PMD defects by sending polarized light pulses having a linewidth sufficiently large to cause substantial depolarization of a backscatter trace of the light pulses as precipitated by the PMD defective section, wherein the larger the linewidth, the lower the PMD value in the short section can be detected, i.e. the smaller the DGD of the defective section can be detected.)

In accordance with the present invention, we have found that a PMD defect having a DGD value of greater than 0.1 ps can be detected in a short section of optical fiber having a length less than 10 meters; a PMD defect having a DGD value of greater than 0.2 ps can be detected in a short section of optical fiber having a length less than 20 meters; a PMD defect having a DGD value of greater than 0.5 ps can be detected in a short section of optical fiber having a length less than 50 meters; and a PMD defect having a DGD value of greater than 1.0 ps can be detected in a short section of optical fiber having a length less than 100 meters. In some embodiments, a linewidth of about 2.5 nm is utilized to detect a PMD defect having a DGD value of about 1 ps. In other embodiments, a linewidth of about 5.0 nm is utilized to detect a PMD defect having a DGD value of about 0.5 ps. The values for linewidth can vary for different pulses having different spectral shapes.

A method for measuring polarization mode dispersion in an optical fiber is disclosed herein. The optical fiber has a longitudinal axis and a length along the longitudinal axis. In one aspect, the method comprises: (a) sending a first polarized input light pulse into a first end of the length of the optical fiber, thereby causing a first backscattered light signal to exit the first end of the optical fiber; (b) obtaining a first backscatter intensity trace corresponding to the length of the optical fiber by effecting a polarization sensitive measurement of the first backscattered light signal; (c) sending a second polarized input light pulse into a second end of the length of the optical fiber, thereby causing a second backscattered light signal to exit the second end of the optical fiber; (d) obtaining a second backscatter intensity trace corresponding to the length of the optical fiber by effecting a polarization sensitive measurement of the second backscattered light signal; (e) analyzing the variation of intensity of the first backscatter intensity trace, wherein the analyzing step comprises analyzing the variation of intensity over a sliding window of data from the first backscatter intensity trace and moving the window of data lengthwise along the length of the fiber while continuing to analyze the variation of intensity to thereby produce a first variation of intensity trace comprising information related to the local variation in intensity along the length of the fiber; (f) analyzing the variation of intensity of the second backscatter intensity trace, wherein the analyzing step comprises analyzing the variation of intensity over a sliding window of data from the second backscatter intensity trace and moving the window of data lengthwise along the length of the fiber while continuing to analyze the variation of intensity to thereby produce a second variation of intensity trace comprising information related to the local variation in intensity along the length of the fiber; and (g) generating an absolute intensity variation difference trace corresponding to the length of optical fiber by determining the absolute magnitude of the difference between the second variation of intensity trace and the first variation of intensity trace. The method preferably further comprises a step (h) relating the absolute intensity variation difference trace to the polarization mode dispersion (PMD) distribution in the fiber.

The relating step preferably further comprises determining the location and longitudinal bounds of a portion of the optical fiber which has an elevated PMD relative to the remainder of the optical fiber. Preferably, the first and second polarized input light pulses penetrate sufficiently deeply into the optical fiber such that the paths traced by the respective pulses at least partially overlap. In preferred embodiments, the sliding window has a width of 0.1 to 5 km. In other preferred embodiments, the sliding window has a width of 0.5 to 2 km. In some preferred embodiments, the first and second polarized input light pulses are generated by modulating an output of a continuous wave light source such that the bandwidths or linewidths of the pulses are controlled.

Preferably, the state of polarization of the respective first and second polarized input light pulses are not aligned with any of the one or more birefringent axes of the optical fiber. In some preferred embodiments, the first and second polarized input light pulses are each linearly polarized. In other preferred embodiments, neither the first nor the second polarized input light pulses are linearly polarized.

In some preferred embodiments, the first and second polarized input light pulses each have a pulse width between 5 and 500 ns.

In preferred embodiments, the first and second polarized input light pulses each have a bandwidth, and wherein the method further comprises controlling the respective bandwidths of the first and second polarized input light pulses.

The method may further comprise sending a third polarized input light pulse with a linewidth greater than 0.5 nm into the first end of the length of the optical fiber, wherein the first and second polarized input light pulses have different polarization angles which are not integer multiples of 180 degrees of each other, preferably wherein the polarization angles of the first and second polarized light pulses between 5 and 175 degrees of each other after taking out the integer multiple of 180 degrees, i.e. the angle modular of the difference in polarization angles is between 5 and 175 degrees (for example, the angle modular of 185 degrees is 5 degrees, the angle modular of 370 degrees=370−2×180=10 degrees, etc.), thereby causing a third backscattered light signal to exit the first end of the optical fiber; obtaining a third backscatter intensity trace corresponding to the length of the optical fiber by effecting a polarization sensitive measurement of the third backscattered light signal; analyzing the variation of intensity of the third backscatter intensity trace, wherein the analyzing step comprises analyzing the variation of intensity over a sliding window of data from the third backscatter intensity trace and moving the window of data lengthwise along the length of the fiber while continuing to analyze the variation of intensity to thereby produce a third variation of intensity trace comprising information related to the local variation in intensity along the length of the fiber; generating a second absolute intensity variation difference trace corresponding to the length of optical fiber by determining the absolute magnitude of the difference between the second variation of intensity trace and the third variation of intensity trace; and relating the second absolute intensity variation difference trace to the polarization mode dispersion (PMD) distribution in the fiber.

Alternatively, the method may further comprise sending a third polarized input light pulse with a linewidth greater than 0.5 nm into the second end of the length of the optical fiber, wherein the second and third polarized input light pulses have different polarization angles which differ by an angle between 5 and 175 degrees after taking out the integer multiple of 180 degrees, thereby causing a third backscattered light signal to exit the second end of the optical fiber; obtaining a third backscatter intensity trace corresponding to the length of the optical fiber by effecting a polarization sensitive measurement of the third backscattered light signal; analyzing the variation of intensity of the third backscatter intensity trace, wherein the analyzing step comprises analyzing the variation of intensity over a sliding window of data from the third backscatter intensity trace and moving the window of data lengthwise along the length of the fiber while continuing to analyze the variation of intensity to thereby produce a third variation of intensity trace comprising information related to the local variation in intensity along the length of the fiber; generating a second absolute intensity variation difference trace corresponding to the length of optical fiber by determining the absolute magnitude of the difference between the third variation of intensity trace and the first variation of intensity trace; and relating the absolute second intensity variation difference trace to the polarization mode dispersion (PMD) distribution in the fiber.

The polarization sensitive measurement preferably comprises passing the backscattered light signals through a polarizer and into a detector.

In another aspect, a method is disclosed herein for measuring polarization mode dispersion in an optical fiber, the optical fiber having a longitudinal axis and a length along the longitudinal axis. The method comprises: (a) sending a first polarized input light pulse with a linewidth greater than 0.5 nm into a first end of the length of the optical fiber, thereby causing a first backscattered light signal to exit the first end of the optical fiber; (b) obtaining a first backscatter intensity trace corresponding to the length of the optical fiber by effecting a polarization sensitive measurement of the first backscattered light signal; (c) analyzing the variation of intensity of the first backscatter intensity trace, wherein the analyzing step comprises analyzing the variation of intensity over a sliding window of data from the first backscatter intensity trace and moving the window of data lengthwise along the length of the fiber while continuing to analyze the variation of intensity to thereby produce a first variation of intensity trace comprising information related to the local variation in intensity along the length of the fiber; and (d) determining whether a portion of the optical fiber has an elevated PMD as indicated where the absolute intensity variation difference trace changes by greater than 0.3 dB in a longitudinal distance of less than 1 km.

The method is applicable to optical fiber wound around a spool or disposed within a cable. The method is also applicable to spun optical fiber as well as unspun optical fiber.

In another aspect, an apparatus is disclosed herein for screening optical fiber for elevated PMD. The apparatus comprises: an OTDR for generating optical pulses having a linewidth greater than 5 nm, preferably greater than 10 nm; a polarizer optically coupled to the OTDR for polarizing the optical pulses, wherein the polarized optical pulses are capable of passing into an end of an optical fiber under test; and a polarization analyzer, optically disposed between the end of the optical fiber and the OTDR, for analyzing backscattered light emanating from the end of the optical fiber. In some embodiments, the apparatus further comprises a continuous wave light source and means for chopping the continuous wave light from the light source into an optical pulses having a desired pulse width. In some embodiments, the linewidth or the bandwidth of the light source is greater than 5 nm. In other embodiments, the line width is greater than 8 nm. In still other embodiments, the linewidth is greater than 12 nm. In one embodiment, the apparatus comprises a continuous wave light source; an OTDR for generating first optical pulses; a pulse generator, optically coupled to the OTDR, for converting the optical pulses into electronic pulses; an acoustic-optic modulator (or acoustic-optic cell), electrically coupled to the pulse generator, and optically coupled to the continuous wave light source, for parsing the continuous wave light into second optical pulses having a desired linewidth which is greater than the linewidth of the optical pulses emitted from the OTDR; a polarizer optically coupled to the acoustic-optic modulator for polarizing the second optical pulses, wherein the polarized second optical pulses are capable of passing into an end of the optical fiber; and a polarization analyzer, optically disposed between the end of the optical fiber and the OTDR, for analyzing backscattered light emanating from the end of the optical fiber. The apparatus may further comprise the controller of the acoustic-optic modulator for adjusting the pulse width of the second optical pulses. In a preferred embodiment, the continuous wave light source comprises a first EDFA (for single stage amplification) and a first band-pass filter with a first linewidth for filtering the output of the first EDFA. The first EDFA may be optically coupled to a broadband light source or laser or a dithered laser. In another preferred embodiment, the continuous wave light source further comprises a second EDFA for amplifying the filtered output of the first EDFA, and a second band-pass filter with a second linewidth for filtering the output of the second EDFA (for two stage amplification), wherein the filtered output of the second EDFA enters the acoustic-optic modulator.

Thus, we have found that backscatter intensity traces from large linewidth pulses allow an analysis which reveals the existence of elevated PMD in an optical fiber, and moreover allow the detection of relatively short length sections of the optical fiber having elevated PMD. We have found that higher linewidths of the pulses permits the detection of lower PMD. This method is effective even when the section of fiber with elevated PMD is as short as a few meters.

DETAILED DESCRIPTION OF THE PREFERRED EMBODIMENTS

As used herein, the polarization sensitive measurement preferably comprises passing the backscattered light signals through a polarizer and before entering into a detector.

The optical path connecting the source of light pulses and the fiber under test comprises at least one optical component. In preferred embodiments, nondegenerately modifying the polarization of the optical path comprises altering an orientation angle of an optical component disposed in the optical path relative to the direction of the optical path, the optical component being disposed in the optical path, wherein the magnitude of the change in the polarization angle is not equal to, or substantially not equal to, a whole number multiple of 180 degrees. A whole number multiple includes a multiple of zero, so the change in the polarization angle is substantially not equal to a whole number multiple of 180 degrees, which includes substantially not equal to 0 degrees. In other preferred embodiments, first and second polarized input light pulses have different polarization angles which differ by an angle between 5 and 175 degrees after taking out the integer multiple of 180 degrees. In one embodiment, the nondegenerate modification of the optical path is accomplished by bending a portion of the optical fiber at the optical path in one or multiple locations.

In preferred embodiments, regions of lower or higher variability, relative to other regions along the length of the fiber, are identified to thereby identify areas of higher or lower polarization mode dispersion along the length of the fiber. This can be accomplished, for example, by analyzing a sliding window of data within which a standard deviation (preferably in log scale) is calculated over the window, and moving the window of data lengthwise along the length of the fiber to produce information related to the local variation along the length of the fiber. The analyzing step preferably comprises spatially resolving the standard deviation with respect to the length of optical fiber. Alternatively, other method steps could be utilized to identify the local level of variation, such as local maximum-minimum difference assessed within a local window.

The methods and apparatus of the present invention result in a number of advantages over previous methods for measuring PMD. First, using the methods disclosed herein, PMD measurements may be conducted non-destructively and in a distributed manner along the length of the fiber. Consequently, these methods can be used to test both newly manufactured fiber as well as fiber that is already installed in a telecommunications system. The methods described herein have proven to be useful and valid both for spun and unspun fiber products. High spatial resolution OTDRs are not needed, beyond what are already available in existing commercial OTDRs. Using the methods disclosed herein, the PMD of a fiber can be measured along the length of the fiber without destroying it. Using the methods disclosed herein, fibers greater than 15 km long, greater than 25 km long, and even greater than 30 km long have been successfully analyzed for PMD.

A preferred source for both emitting the pulse radiation and measuring the radiation which is backscattered or reflected back through the fiber is an optical time domain reflectometer (OTDR). While OTDRs have been used to measure a variety of properties of optical fibers, they are most commonly employed to measure fiber attenuation and to identify locations where breaks or discontinuities occur in the fiber. By OTDR as used herein, we mean a device which is capable of sending a light down an optical waveguide fiber and observing the small fraction of light that is scattered back towards the detector. Typical OTDRs can resolve the intensity of radiation backscattered along the length of the fiber. Most of the OTDRs achieve this by sending pulsed radiation into the fiber under test and measuring the backscattered radiation at a given timing. While typical pulsewidths may range from 0.5 meters (5 nanoseconds) to 2000 meters (20 microseconds), the present invention preferably employs pulse widths of between about 10 and 500 ns, more preferably between about 50 and 200 ns.

In some preferred embodiments, the light pulse has a linewidth greater than 0.5 nm. In other preferred embodiments, the light pulse has a linewidth greater than 1 nm. In still other preferred embodiments, the light pulse has a linewidth greater than 2 nm. In yet other embodiments, the light pulse has a linewidth greater than 5 nm. In other preferred embodiments, the light pulse has a linewidth greater than 10 nm. Linewidth is measured at 3 dB below peak.

Preferably, the OTDR is a polarization OTDR, which is an OTDR capable of emitting polarized radiation and analyzing the polarized radiation from backscattered light. We have found that evaluation of optical fiber with broader linewidth light pulses results in a variation of intensity trace or signature which results in a drop in the variation of intensity corresponding to the axial location on the fiber at which a defective PMD portion occurs, wherein the intensity stays lower for subsequent portions of the fiber (in a direction of the test pulse), unlike known methods which result in a trace whose intensity substantially rises at locations where a defective PMD portion is absent.

Figure 1:
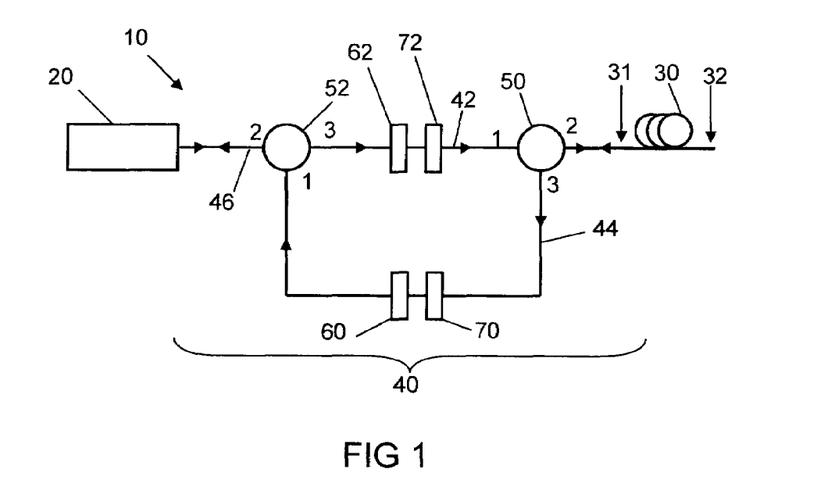
FIG. 1 schematically illustrates an apparatus in accordance with the present invention.

FIG. 1 illustrates an apparatus 10 suitable for use in practicing the method of the present invention which includes a source of light pulses, such as an emitter, and a light detector. The emitter and the detector may be separate components or may be disposed in an OTDR 20, which is capable of generating and sending a pulse of laser light into an optical waveguide fiber 30. The OTDR is capable of injecting a series of optical pulses into an optical fiber 30 under test via an optical path 40, and the OTDR 20 can also detect, from the same end of the fiber 30, via the optical path 40, light that is scattered back to extract information therefrom. As used herein, optical path refers to the path that input pulses travel on toward, and backscatter return signals travel away from, an optical fiber under test. The optical path comprises at least one optical component.

The OTDR 20 can be a conventional OTDR (without polarization sensitive measurement capability) or a POTDR apparatus which has polarization detection capability. In the embodiment illustrated in FIG. 1, two optical circulators 50 and 52 and two polarizers 60 and 62 are provided in the optical path 40. The optical circulators 50 and 52 are configured to direct the initial pulse of light emitted from the OTDR 20 through polarizer 62 and to the fiber 30 under test and to direct the backscattered pulse through polarization analyzer 60 (which is essentially a polarizer) in the return portion 44 of the optical path 40 before the backscattered light reaches the detector inside the OTDR 20. Note that in the optical circulators 50 and 52 which are illustrated, only port 2 allows the light to come in and out. The traveling of light in all other ports is unidirectional. Specifically, the light is allowed to travel from port 1 to port 2, and from port 2 to port 3 unidirectionally. Polarizer 62 and optional wave plate 72 are inserted in the input portion 42 of the optical path 40, and polarization (analyzer) 60 and optional waveplate 70 are inserted in the return portion 44 of the optical path 40. If a POTDR is utilized to generate polarized pulses, polarizer 62 is also optional. The light pulses that enter the fiber under test 30 have a linewidth greater than 5 nm, and in some embodiments greater than 10 nm, and in other embodiments between 5 and 50 nm.

Other optical components may be disposed in the optical path 40 in the embodiments disclosed herein. For example, a polarization controller may be employed to maximize the amount of light launched into the fiber 30 under test. A polarization controller disposed before a polarizer in the optical path 40 can align the state of polarization in the fiber 30 to be incident on the polarizer.

In the embodiments disclosed herein, the light pulses entering the fiber 30 under test are polarized, and the backscattered light is polarized before being detected to effect a polarization sensitive measurement.

The apparatus 10 is set up such that the light pulses that enter the fiber under test 30 are nondegenerate with respect to any birefringent axis of the fiber. Modification of the polarization of the optical path 40 can be effected by, for example, changing the polarizing angle of one or more optical components in the optical path, such as changing the polarizing angle of polarizer 62. A rotatable polarizer can be advantageously used for changing the angle of the polarizing axis. If a POTDR is utilized for providing polarized pulses, then the polarizing angle of the pulses emanating from the POTDR may also be changed. In addition, or instead, one or more optical components (such as optional waveplates 70 and 72) may be added to the optical path, and/or one or more optical components may be removed from the optical path, in order to modify the polarization of the optical path.

EXAMPLE 1

Figure 2:
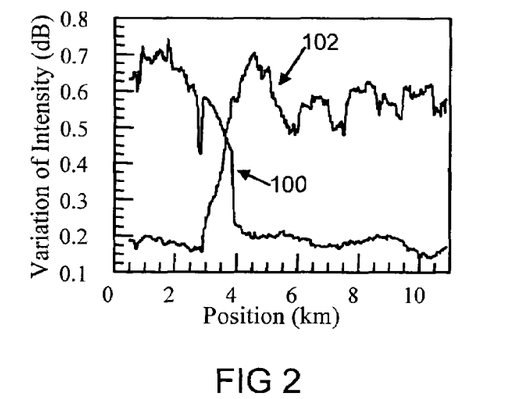
FIG. 2 shows variation of intensity traces in dB of optical fiber evaluated with the arrangement of FIG. 1 plotted against position along the longitudinal axis of the fiber.

An optical fiber test apparatus 10 as illustrated in FIG. 1 was utilized to test a 12 km length of optical fiber to demonstrate an embodiment of the present invention. A first end 31 of the fiber 30 was optically coupled to the optical path 40. The pulse width of the pulses emitted from POTDR 20 were 100 ns. Known OTDRs typically provide linewidths of between 1 nm and 2 nm. The polarizing angle of polarizer 60 and of polarizer 62 was fixed for all measurements. The variation of intensity of the first POTDR trace was analyzed by determining the standard deviation of the first POTDR trace over a sliding window of data from the first POTDR trace and moving the window of data lengthwise along the length of the fiber while continuing to analyze the variation of intensity, to obtain a first variation of intensity trace 100, as seen in FIG. 2. The first end 31 of the fiber 30 was detached from the optical path 40, and the second (opposite) end 32 of the fiber 30 was optically coupled to the optical path 40 and a second POTDR trace was obtained. The first and second POTDR traces were obtained at about 1550 nm. The variation of intensity of the second POTDR trace was analyzed by determining the standard deviation of the second POTDR trace over a sliding window of data from the second POTDR trace and moving the window of data lengthwise along the length of the fiber while continuing to analyze the variation of intensity, to obtain a second variation of intensity trace 102, as seen in FIG. 2.

As seen in FIG. 2, trace 100, taken singly, would seem to indicate that a PMD defect (defective portion of the optical fiber) was present at a fiber axial location starting at 3 km and extending to longer axial locations (for example between 3 and 11 km). The lowest intensity of trace 100 is about 0.14 dB. On the other hand, trace 102, taken singly, would seem to indicate that a PMD defect (defective portion of the optical fiber) was present at a fiber axial location starting at 4 km and extending to shorter axial locations (for example between 0 and 4 km). The lowest intensity of trace 102 is about 0.14 dB. Thus, for a single trace (100 or 102), a change in the variation of intensity traces 100 and 102 exceeding 0.3 dB in less than 1 km of fiber path length indicates the starting point of a defectively high PMD section of fiber. Analysis of the fiber according to this aspect of the invention is advantageous when, for example, only one end of the fiber is accessible for testing, or when the entire fiber length is so long that the POTDR pulses do not penetrate deeply enough from each end of the fiber so as to provide a sufficient overlap of fiber path traversed. For example, if the dynamic range of a POTDR and optical path setup is 35 km penetration into a fiber and it is desired to analyze a 50 km length of fiber, then only the middle 20 km would be overlapped by first and second pulses traveling inward from the first and second ends, respectively, but a trace from one end is useful for evaluating up to 35 km. However, taken together, both the first and second variation of intensity traces 100 and 102 exhibit sharp drops in each trace which bound the fiber length locations of the defective PMD region of the fiber, here between 3 and 4 km, as seen in FIG. 2. We have found that the location of the PMD defective region of the fiber can be further refined by a difference trace derived from the first and second variation of intensity traces.

Figure 3:
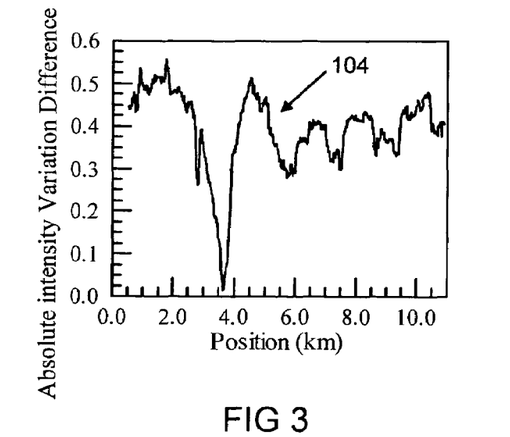
FIG. 3 shows the absolute intensity variation difference trace determined from the variation of intensity traces of FIG. 2.

According to another aspect of the present invention, the variation of intensity traces 100, 102 were further analyzed by subtracting the second variation of intensity trace 102 from the first variation of intensity trace 100. An absolute intensity variation difference trace 104, as shown in FIG. 3, was obtained by determining the absolute magnitude of the difference between the first and second variation of intensity traces 100, 102. That is, the first variation of intensity trace is subtracted from the second variation of intensity trace (or vice versa) at corresponding points along the longitudinal length of the fiber. Absolute intensity variation difference trace 104 is shown in FIG. 3 in dB plotted against position along the longitudinal axis of the fiber. The intensity variation difference trace 104 shows a marked dip or sharp transition between 3 and 4 km along the length of the fiber.

A change in the absolute intensity variation difference trace of greater than 0.3 dB occurs in less than 1 km of fiber.

For comparison and verification, the fiber was then destructively tested to investigate PMD quality. A 42 meter length of the fiber from between the 3 and 4 km location was identified as having elevated PMD, and the 42 m length was further cut into 14 sections of 3 m lengths. Further direct differential group delay (DGD) measurements were conducted using Jones matrix eigenanalysis (JME) method for a reading on the fiber DGD, and the DGD measurement results verified that the defect (defectively high PMD) corresponded to a DGD of 0.39 ps which was confined to a 6 meter length of fiber, as measured along the length, or along the longitudinal axis of the fiber.

Thus, information related to the local variation in intensity along the portion of the length of the fiber was produced, and the variation of intensity was shown to relate to the polarization mode dispersion (PMD) distribution in the fiber. A test fiber could be used to calibrate, at least roughly, a threshold level for selecting out a fiber or a portion or portions of a fiber that has undesirably elevated PMD.

Referring again to FIG. 2, it should be noted that the first trace 100 drops to a lower value at 4 km and stays generally lower for greater distances along the fiber length. According to one or more known PMD evaluation schemes, the continued lower value would suggest that the fiber has undesirably high PMD for the remainder of the fiber length beyond 4 km. In contrast, however, the present invention provides the more accurate assessment of the fiber PMD by revealing that the fiber PMD at locations greater than 4 km actually has a lower, more acceptable, PMD value, in this case covering a large portion of the fiber that would have been dismissed as defective by the known method. Thus, the present invention avoids such erroneous conclusions that could be encountered by known schemes.

We have also generally found for the fibers that we have tested that the existence of values of the absolute intensity variation difference trace which are greater than 0.3 dB indicates that some portion of that particular fiber has elevated PMD, and the elevated PMD section is located where the absolute intensity variation difference trace 104 reaches a low value, relative to the remainder of the trace. We have also generally found that values of the absolute intensity variation difference trace 104 which are everywhere in the fiber (i.e. across the entire length of the fiber) less than 0.15 dB indicates that the particular fiber has acceptable PMD.

EXAMPLE 2

Figure 4:
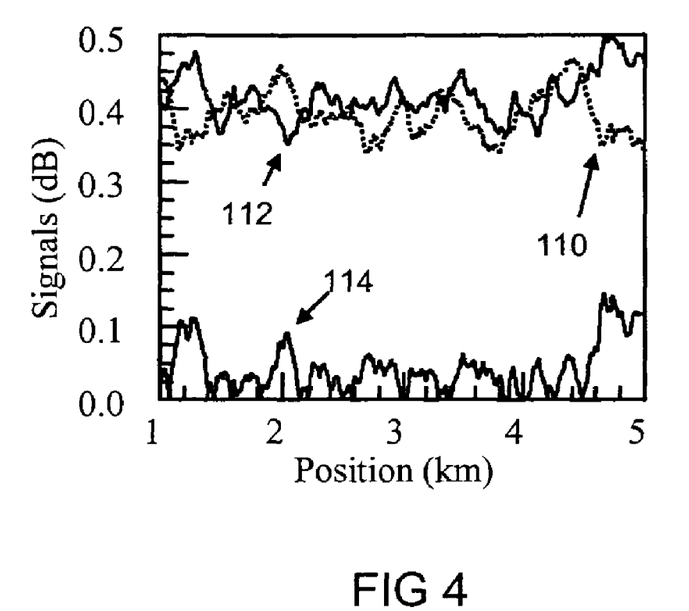
FIG. 4 shows two variations of intensity traces and the absolute intensity variation difference trace thereof for another optical fiber which did not have an elevated PMD.

FIG. 4 shows first and second variation of intensity traces 110, 112, as well as the absolute intensity variation difference trace 114, for an optical fiber which has PMD values less than 0.1 ps/km$^{1/2}$ everywhere across its length. The absolute intensity variation difference trace 104 is less than 0.12 dB across the entire length of the fiber.

Implementation of the present invention requires that the orientations of polarization angles of the first and second polarized input light pulses are not aligned with any of the birefringent axes of the optical fiber. That is, the state of polarization of the light incident on the fiber under test, or the defective fiber with highly elevated PMD, is not linearly polarized and not well aligned with one of the two birefringent axes of the optical fiber. In the rare event that the incident light on the fiber is linearly polarized and its orientation is aligned with one of the birefringent axes, the presence of elevated PMD may not be detectable if the light passing through an elevated PMD section of fiber, despite the involvement of several wavelengths, remains polarized, and, therefore, the marked reduction in the variation of intensity trace would not be observed, which can lead to an erroneous reading. Such a possibility can be mitigated by conducting multiple measurements and launching distinct states of polarization into the fiber in each of the measurements, detecting any sharp transitions in the variation of intensity traces and disregarding traces having no sharp transitions, in order to identify a defective fiber or defective fiber section. The distinct states could be obtained by nondegenerately modifying the polarization of the optical path, such as by altering an orientation angle of an optical component disposed in the input portion of the optical path, wherein the magnitude of the change in the polarization angle is not equal to, or substantially not equal to, an integer whole number multiple of 180 degrees. A whole number multiple includes a multiple of zero, so the change in the polarization angle is substantially not equal to a whole number multiple of 180 degrees, which includes substantially not equal to 0 degrees. Thus, the occurrence of a substantial dip (more than 0.2 dB, preferably more than 0.3 dB) in a trace tends to indicate the presence of an elevated PMD section of fiber, while a nonoccurrence should be regarded as inconclusive (either no PMD defect or alignment of the pulse with one of the birefringent axes of the fiber has occurred).

EXAMPLE 3

Figure 5:
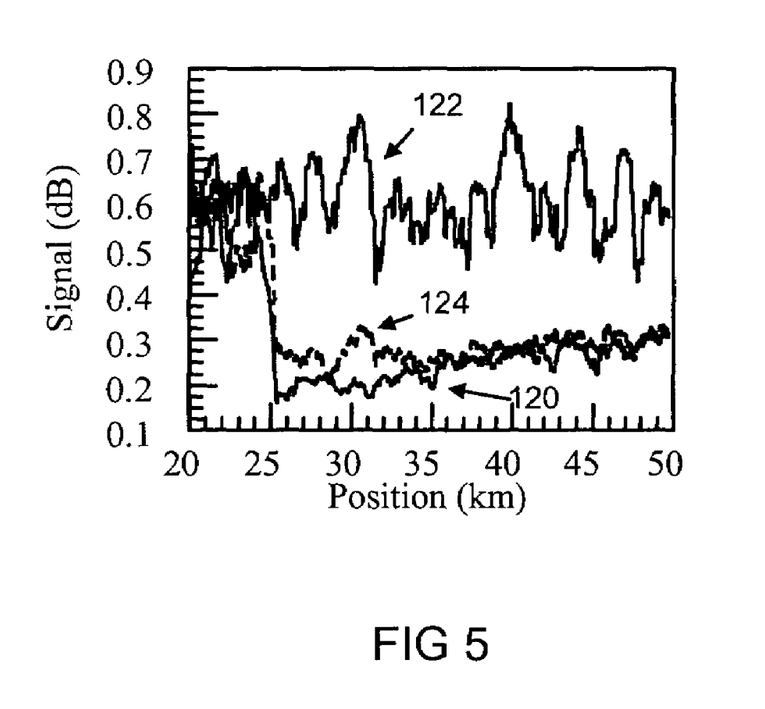
FIG. 5 shows three variation of intensity traces from an optical fiber wherein one trace does not reveal the location of a PMD defect.

FIG. 5 schematically illustrates the variation of intensity of traces taken from a 50 km length of optical fiber into which first, second, and third polarized input light pulses were sent into the same end of an optical fiber via an apparatus such as shown in FIG. 1, wherein polarizer 62 was set to three different polarizer angles of 0 degrees, 45 degrees, and −45 degrees corresponding to the first, second, and third polarized input light pulses, and respective backscatter intensity traces were obtained, and first, second, and third variation of intensity traces, 120, 122, and 124 respectively, were obtained. As seen in FIG. 5, the first and third traces 120 and 124 indicate that a PMD defect is situated at a location of 25 km, while such location is not determinative from the second trace 122. Thus, two variation of intensity traces correctly capture the location of the PMD defect, while one trace misses the location, where we believe that the state of polarization of the second light pulses incident on the fiber under test was well aligned with one of the two birefringent axes of the optical fiber. In some preferred embodiments, the method comprises launching three distinct pulses into a first end of the fiber, each pulse having different states of polarization (for example obtained by changing the polarizing angle of the polarizer upstream of the fiber), obtaining their respective backscatter traces, selecting the lowest dip trace from the first end, launching three distinct pulses into a second end of the fiber, each pulse having different states of polarization, obtaining their respective backscatter traces, selecting the lowest dip trace from the second end, and utilizing the two selected traces to obtain a difference trace, and determining the absolute magnitude of the difference trace along the length of the fiber. In a preferred embodiment, a method for measuring polarization mode dispersion in an optical fiber having a longitudinal axis and a length along the longitudinal axis comprises: (a) sending a first plurality of polarized input light pulses into a first end of the length of the optical fiber, the first plurality of polarized input light pulses comprising first, second, and third polarized input light pulses each having respective states of polarization upon entering the first end of the fiber, wherein the respective states of polarization of the first, second, and third polarized input light pulses differ from each other, thereby causing a plurality of backscattered light signals to exit the first end of the optical fiber, the first plurality of backscattered light signals comprising first, second, and third backscattered light signals corresponding to the first, second, and third polarized input light pulses; (b) obtaining first, second, and third backscatter intensity traces corresponding to the length of the optical fiber by effecting a polarization sensitive measurement of the first, second, and third backscattered light signals; (c) sending a second plurality of polarized input light pulses into a second end of the length of the optical fiber, the second plurality of polarized input light pulses comprising fourth, fifth, and sixth polarized input light pulses each having respective states of polarization upon entering the second end of the fiber, wherein the respective states of polarization of the third, fourth, and fifth polarized input light pulses differ from each other, thereby causing a plurality of backscattered light signals to exit the second end of the optical fiber, the second plurality of backscattered light signals comprising third, fourth, and fifth backscattered light signals corresponding to the third, fourth, and fifth polarized input light pulses; (d) obtaining fourth, fifth, and sixth backscatter intensity traces corresponding to the length of the optical fiber by effecting a polarization sensitive measurement of the fourth, fifth, and sixth backscattered light signals; (e) analyzing the variation of intensity of the first, second, third, fourth, fifth, and sixth backscatter intensity traces, wherein the analyzing step comprises analyzing the variation of intensity over a sliding window of data from the respective backscatter intensity traces and moving the window of data lengthwise along the length of the fiber while continuing to analyze the variation of intensity to thereby produce first, second, third, fourth, fifth, and sixth variation of intensity traces comprising information related to the local variation in intensity along the length of the fiber; and (f) selecting a first selected variation of intensity trace from a first group consisting of the first, second, and third variation of intensity traces; (g) selecting a second selected variation of intensity trace from a second group consisting of the fourth, fifth, and sixth variation of intensity traces; (h) generating an absolute intensity variation difference trace corresponding to the length of optical fiber by determining the absolute magnitude of the difference between the second selected variation of intensity trace and the first selected variation of intensity trace; and (i) relating the absolute intensity variation difference trace to the polarization mode dispersion (PMD) distribution in the fiber. Preferably, the first selected variation of intensity trace is the variation of intensity trace having the lowest intensity within the first group. Preferably, the second selected variation of intensity trace is the variation of intensity trace having the lowest intensity within the second group. Preferably, the respective states of polarization differ from each other by at least 5 degrees.

Figure 6:
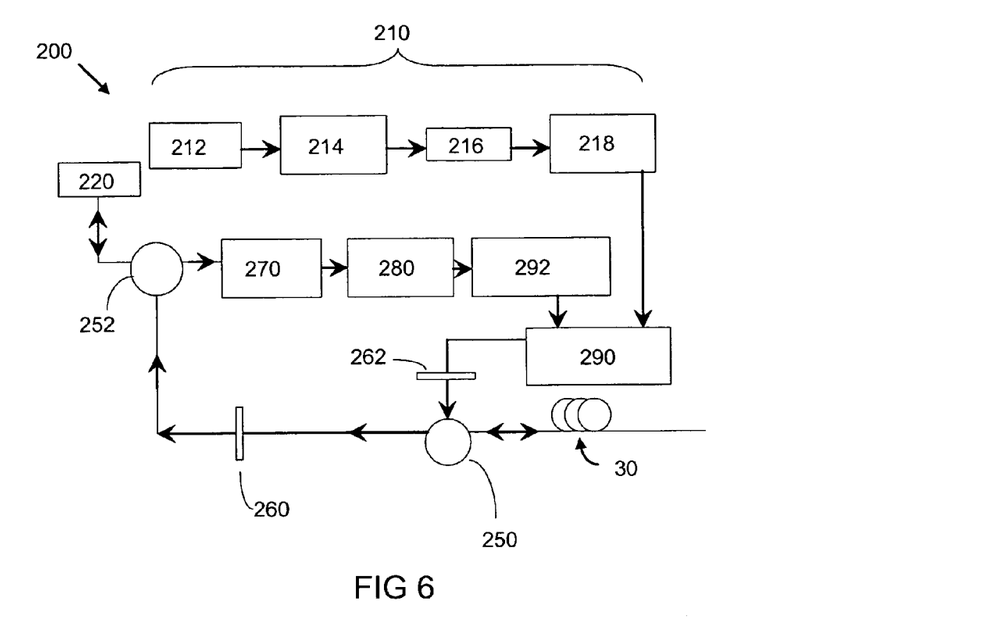
FIG. 6 schematically illustrates another embodiment of an apparatus according to the present invention.

FIG. 6 illustrates another apparatus 200 for testing or screening the PMD in an optical fiber 30. The apparatus 200 provides to the optical fiber under test 30 light pulses having a wider linewidth than the linewidth of the OTDR 220 that is incorporated in the apparatus 200. The apparatus 200 comprises: a continuous wave light source 210; an OTDR 220 for generating first optical pulses with a given pulse width; a pulse generator 280, optically coupled to the OTDR 220, for converting the optical pulses into electronic pulses; an acoustic-optic modulator 290, electrically coupled to the pulse generator 280, and optically coupled to the continuous wave light source 210, for parsing the continuous wave light into second optical pulses having a desired linewidth which is greater than the linewidth of the optical pulses emitted from the OTDR 220; a polarizer 262 optically coupled to the acoustic-optic modulator 290 for polarizing the second optical pulses, wherein the polarized second optical pulses are capable of passing into an end of the optical fiber 30; and a polarization analyzer or polarizer 260, optically disposed between the end of the optical fiber 30 and the OTDR 220, for analyzing backscattered light emanating from the end of the optical fiber 30. The continuous wave light source 210 in this embodiment has two-stage amplification and comprises a first EDFA 212, a first band-pass filter 214 with a first linewidth for filtering the output of the first EDFA 212, a second EDFA 216 for amplifying the filtered output of the first EDFA 212, a second band-pass filter 218 with a second linewidth for filtering the output of the second EDFA 216, wherein the filtered output of the second EDFA 216 enters the acoustic-optic modulator 290. An acoustic-optic modulator controller 292, attached to the acoustic-optic modulator 290, receives electronic pulses from pulse generator 280 and is provided for chopping the continuous wave into optical pulses with specified pulse width. Two optical circulators 250 and 252 and two polarizers 260 and 262 are provided in the optical path between the OTDR 220 and the fiber under test 30. An optical detector 270 is disposed between optical circulator 252 and pulse generator 280. The optical circulator 252 is configured to direct the initial pulse of light emitted from the OTDR 220 to the pulse generator 280 and to direct the polarized backscattered pulse from the polarization analyzer 260 (which is essentially a polarizer) in the return portion of the optical path to the detector inside the OTDR 220. The optical circulator 250 is configured to direct the pulses of light from the acoustic-optic modulator 290 to the fiber under test 30 and to direct the backscattered pulse from the fiber under test 30 into polarization analyzer 260 in the return portion of the optical path 40. In the optical circulators 250 and 252, only port 2 allows the light to come in and out. The traveling of light in all other ports is unidirectional. Specifically, the light is allowed to travel from port 1 to port 2, and from port 2 to port 3 unidirectionally. The light output from the OTDR 220 is first converted into an electronic pulse train with timing and duration the same as the optical pulse train from the OTDR 220 to drive or trigger the pulse generator 280. The electronic pulse train is reconstructed to modulate the CW light coming from the two stage amplification of the EDFA 216, in order to chop it into a light pulse train which is similar to, or essentially the same as, the original light pulse train except that the linewidth is broader as controlled by the bandpass filters 214 and 218. A desired light source linewidth can be obtained by appropriately selecting the two bandpass filters 214 and 218. The polarizer 262 serves as the polarization controller for launching polarized light into the fiber under test 30 and polarization analyzer 260 in the return path to analyze the backscattered light. With this configuration, the onset of the sharp transition in the absolute intensity variation difference trace can be reached at lower DGD values, providing the capability of detecting less severe PMD failure, i.e. lower and lower PMD acceptance thresholds for larger linewidths.

While the standard deviation may be calculated in linear scale, preferably it is calculated in log scale. The preferred size for the sliding data window is 500 to 2000 meters. By sliding the data window along the length of the fiber and continuously calculating standard deviation along the length of the fiber, we generate a new set of data, which we call a variation of intensity trace. The window size indicates the width of the data that is used to calculate one data point in the trace. Wider window size gives less variability in the trace.

Without the need or the desire to be bound by any particular theory, we note that the state of polarization evolves periodically in a linear birefringent fiber, and such periodicity can be observed by an optical time domain reflectometer. Both linear birefringent fiber (unspun fiber) and spun fiber have been described. See X. Chen, T. L. Hunt, M.-J. Li, and D. A. Nolan, "Properties of polarization evolution in spun fibers", Optics Letters Vol. 28 (No. 21) 2028–2030 (2003). The normalized intensity as a function of position as seen by the POTDR can be characterized by the equation:

$$I(z) = \frac{1}{2}(1 + \cos(2 \times \text{Phase}(z)))$$

For the simple case of a linearly birefringent fiber and an idealized single wavelength POTDR with a polarizer that is offset 45 degrees with the birefringent axis of the fiber, the above equation can take the following simple form:

$$I(z) = \frac{1}{2}\left(1 + \cos\left(\frac{2\pi z}{L_B/2}\right)\right)$$

where $L_b$ is the beatlength of the fiber at the wavelength $\lambda$. The light source of an actual OTDR has finite bandwidth, so many wavelengths centered around $\lambda_0$ with a half width of $\Delta\lambda/2$ contribute to the intensity seen by the OTDR. The total (integrated) intensity as a function of position can be described by the integral:

$$I(z) = \int \frac{1}{2} g(\lambda)(1 + \cos(2 \times \text{Phase}(z, \lambda))) d\lambda$$

where $g(\lambda)$ is the spectral weight function.

We believe that the mechanism for identifying high PMD section is related to the spectral depolarization of the light pulses passing through a fiber section with elevated PMD. A section with high PMD is essentially a section of polarization maintaining fiber. An optical fiber with a relatively short segment having elevated PMD would be comprised of a low PMD section of fiber followed by a short section of fiber with high PMD, which is further followed by another low PMD fiber section, wherein the birefringence level or PMD level of each section is different. The phase delay between the two principle states of polarization after the short section of high PMD can be expressed in the following form, $$\text{Phase} = \text{Phase}_a + \frac{2\pi \cdot c \cdot \tau}{\lambda} + \text{Phase}_b(z)$$

where $\text{phase}_a$ is the phase difference accumulated between the two polarization states in the fiber up to the point where the defect (leading to elevated PMD) is reached, and $\text{phase}_b$ is the phase difference accumulated from the end of the defective section (which can be of quite short length) with high PMD up to a position z of interest, and τ is the total DGD of the short section of the fiber. For high DGD values of τ, the term $$\frac{2\pi \cdot c \cdot \tau}{\lambda}$$

is highly wavelength dependent because the linewidth or bandwidth Δλ of light sources (such as used in an OTDR) has a finite value, leading to spectral depolarization. Typical linewidth values of commercial OTDRs range between 1 and 3 nm. In a simplified analysis of the spectral depolarization mechanism, if the phase at the wavelength λ–Δλ/2 (the lower edge of the window) and at the wavelength λ+Δλ/2 (the higher edge of the window) is on the order of 180 degrees or π radians, the polarization fluctuation for the fiber beyond the defective section would be completely washed out, which we refer to as spectral depolarization. The value of the DGD that can lead to the 180 degrees phase shift across the window can be generally determined by the following equation.

$$\frac{2 \cdot c \cdot \tau \cdot \Delta\lambda}{\lambda^2} = C,$$

where C is a number having a value on the order of 1. C takes the value of 1 when the phase difference between two edges of the bandwidth is 180 degrees out of phase. Even if the phase difference between the wavelength of Δλ apart is not completely out of phase (180 degrees apart), substantial spectral depolarization can occur. Therefore, for a practical estimate of the onset of the spectral depolarization, C takes a value less than one, for example 0.3. The actual linewidth Δλ needed for a spectral depolarization can also vary slightly depending upon the spectral line shape as described by the spectral weight function, g(λ). When spectral depolarization occurs, regardless of how low the PMD is for the remaining fibers beyond the short section with high DGD, the light traveling in the fiber is at least partially depolarized. Viewed by the POTDR, the light intensity along the defective section and the non-defective section following the defective section of fiber, as determined from the backscatter trace, illustrates low variation regardless of the fiber PMD quality. Such a result is illustrated in FIG. 2. Thus, when a larger linewidth Δλ is used, a smaller τ can be detectable, and the existence of an even lower level of elevated PMD can be identified. In order to detect a smaller selected τ (DGD), i.e. in order to detect a defect generating a smaller PMD, a larger linewidth is required in order to obtain substantial depolarization as seen in a backscatter trace, which is triggered by a PMD defect having a DGD greater than the selected DGD.

Figure 7:
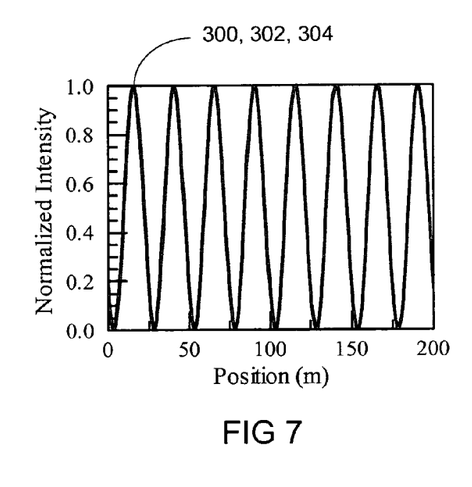
FIG. 7 shows the intensity evolution at three wavelengths for a fiber portion that follows a fiber portion with 0.05 ps differential group delay (DGD).
Figure 8:
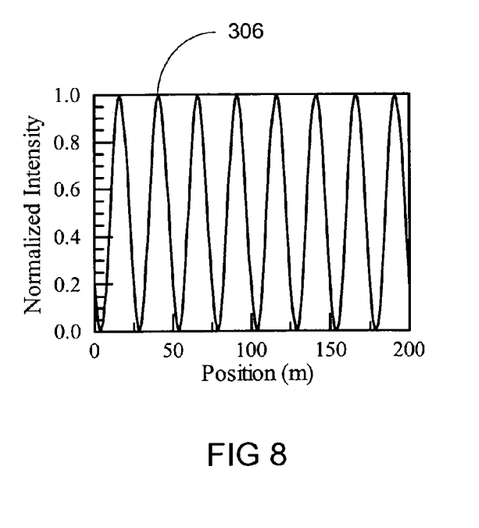
FIG. 8 shows the integrated intensity of the intensities of FIG. 7.
Figure 9:
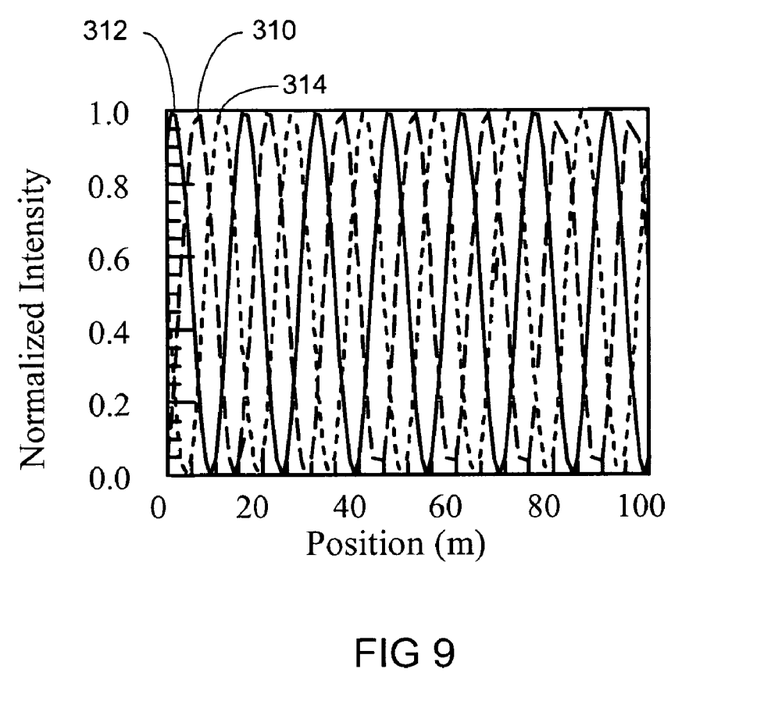
FIG. 9 shows the intensity evolution at three wavelengths for a fiber portion that follows a fiber portion with 1.07 ps differential group delay (DGD).
Figure 10:
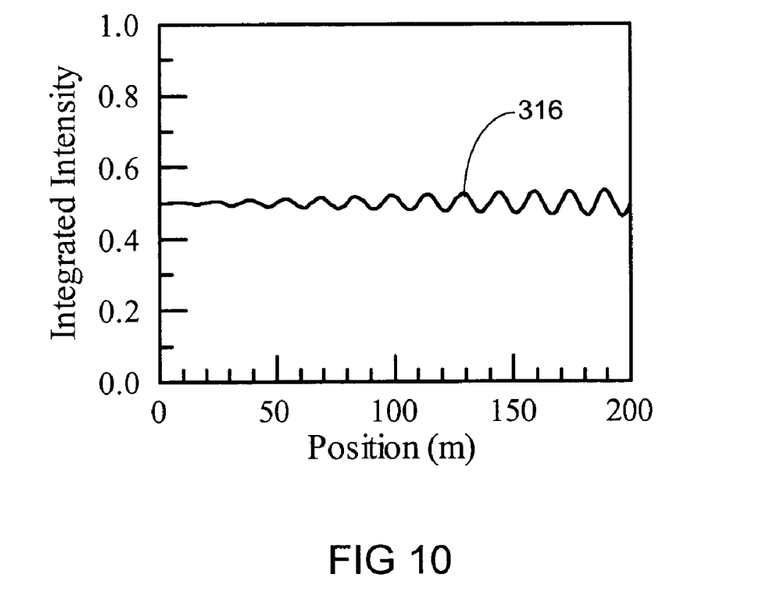
FIG. 10 shows the integrated intensity of the intensities of FIG. 9.

We modeled two cases to illustrate the effect of spectral depolarization. In the first case, FIG. 7 shows the intensity evolution for a fiber with beatlength of 30 m at 1550 nm where the light source of the OTDR is assumed to have a flat shape over 5 nm centered around 1550 nm, and the fiber segment shown is disposed directly adjacent after a fiber with 0.05 ps differential group delay (DGD). FIG. 7 shows the intensities (300, 302, 304) of the individual wavelength for wavelengths of 1547.5 nm, 1550 nm, and 1552.5 nm, and FIG. 8 shows the integrated intensity (306) of FIG. 7. Because the accumulated DGD before the illustrated fiber is so small, the three intensity curves associated with each wavelength are almost on top of each other. The wavelength dependence of the intensity is minor so that the behavior of the polarization evolution of the illustrated fiber is not meaningfully affected by the DGD of the prior segment of the fiber. In the second case, FIG. 9 shows the intensity evolution for a fiber with beatlength of 30 m at 1550 nm where the light source of the OTDR is assumed to have a flat shape over 5 nm centered around 1550 nm, and the fiber segment shown is disposed directly adjacent after a fiber with 1.07 ps differential group delay (DGD), representing a defective PMD portion of fiber. FIG. 9 shows the intensities (310, 312, 314) of the individual wavelength for wavelengths of 1547.5 nm, 1550 nm, and 1552.5 nm, and FIG. 10 shows the integrated intensity (316) of FIG. 9. Because of the large DGD present before the subject fiber (section) of interest, the intensity evolution of the subject fiber as seen by the OTDR is wavelength dependent and out of phase. Therefore, when adding them together to form an integrated intensity trace, partial cancellation occurs, and the resulting intensity trace shows a low level of modulation depth. Thus, the portion of a fiber after a major PMD defect would be reflected in a trace by a continued low intensity level variability.

What is claimed is:

1. A method for measuring polarization mode dispersion in an optical fiber having a longitudinal axis and a length along the longitudinal axis, the method comprising:

(a) sending a first polarized input light pulse into a first end of the length of the optical fiber, thereby causing a first backscattered light signal to exit the first end of the optical fiber;

(b) obtaining a first backscatter intensity trace corresponding to the length of the optical fiber by effecting a polarization sensitive measurement of the first backscattered light signal;

(c) sending a second polarized input light pulse into a second end of the length of the optical fiber, thereby causing a second backscattered light signal to exit the second end of the optical fiber;

(d) obtaining a second backscatter intensity trace corresponding to the length of the optical fiber by effecting a polarization sensitive measurement of the second backscattered light signal;

(e) analyzing the variation of intensity of the first backscatter intensity trace, wherein the analyzing step comprises analyzing the variation of intensity over a sliding window of data from the first backscatter intensity trace and moving the window of data lengthwise along the length of the fiber while continuing to analyze the variation of intensity to thereby produce a first variation of intensity trace comprising information related to the local variation in intensity along the length of the fiber;

(f) analyzing the variation of intensity of the second backscatter intensity trace, wherein the analyzing step comprises analyzing the variation of intensity over a sliding window of data from the second backscatter intensity trace and moving the window of data lengthwise along the length of the fiber while continuing to analyze the variation of intensity to thereby produce a second variation of intensity trace comprising information related to the local variation in intensity along the length of the fiber; and (g) generating an absolute intensity variation difference trace corresponding to the length of optical fiber by determining the absolute magnitude of the difference between the second variation of intensity trace and the first variation of intensity trace.

2. The method of claim 1 further comprising relating the absolute intensity variation difference trace to the polarization mode dispersion (PMD) distribution in the fiber.

3. The method of claim 2 wherein the relating step further comprises determining the location and longitudinal bounds of a portion of the optical fiber which has an elevated PMD relative to the remainder of the optical fiber.

4. The method of claim 1 wherein the first and second polarized input light pulses penetrate sufficiently deeply into the optical fiber such that the paths traced by the respective pulses at least partially overlap.

5. The method of claim 1 wherein the sliding window has a width of 0.1 to 5 km.

6. The method of claim 1 wherein the first and second polarized input light pulses are generated by modulating an output of a continuous wave light source such that the linewidths of the pulses are controlled.

7. The method of claim 1 wherein the optical fiber has two birefringent axes, and the orientations of polarization angles of the respective first and second polarized input light pulses are not aligned with any of the two birefringent axes.

8. The method of claim 1 wherein the first and second polarized input light pulses are each linearly polarized.

9. The method of claim 8 wherein neither the first nor the second polarized input light pulses are linearly polarized.

10. The method of claim 1 wherein the first and second polarized input light pulses each have a pulse width between 5 and 500 ns.

11. The method of claim 1 wherein the first and second polarized input light pulses each have a linewidth, and wherein the method further comprises controlling the respective bandwidths of the first and second polarized input light pulses.

12. The method of claim 1 wherein the respective polarization sensitive measurements of the first and second backscattered light signals each comprise passing the respective backscattered light signals through a polarizer and into a detector.

* * * * *